Dec. 7, 1943.   W. H. OWEN   2,336,286
DILATION OR EXPANSION TESTING FURNACE AND MEASURING MEANS
Filed Aug. 8, 1940   3 Sheets-Sheet 1
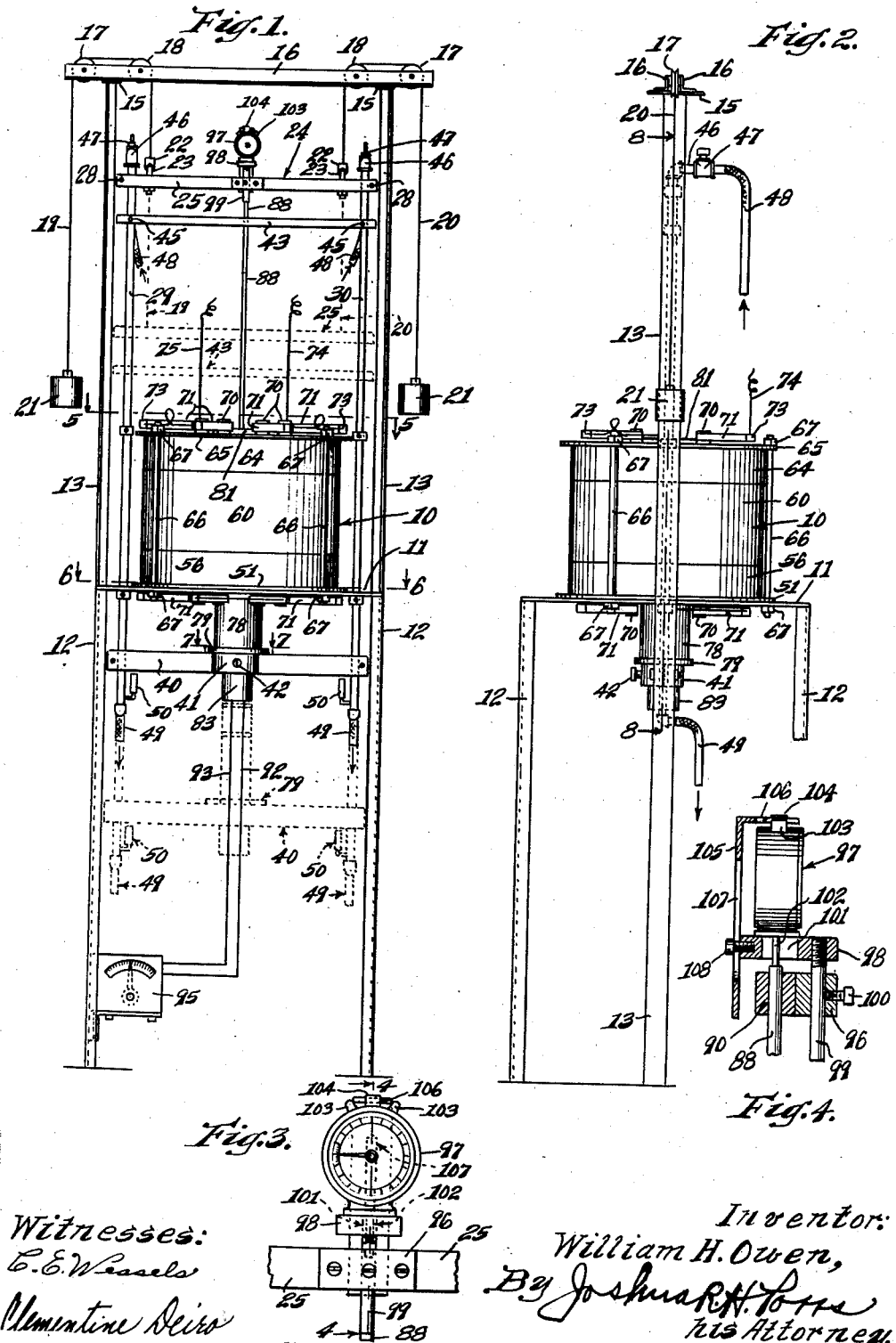
Witnesses:
C. E. Wessels
Clementine Deiro
Inventor:
William H. Owen,
By Joshua R. H. Potts
his Attorney.

Dec. 7, 1943.  W. H. OWEN  2,336,286
DILATION OR EXPANSION TESTING FURNACE AND MEASURING MEANS
Filed Aug. 8, 1940  3 Sheets-Sheet 2
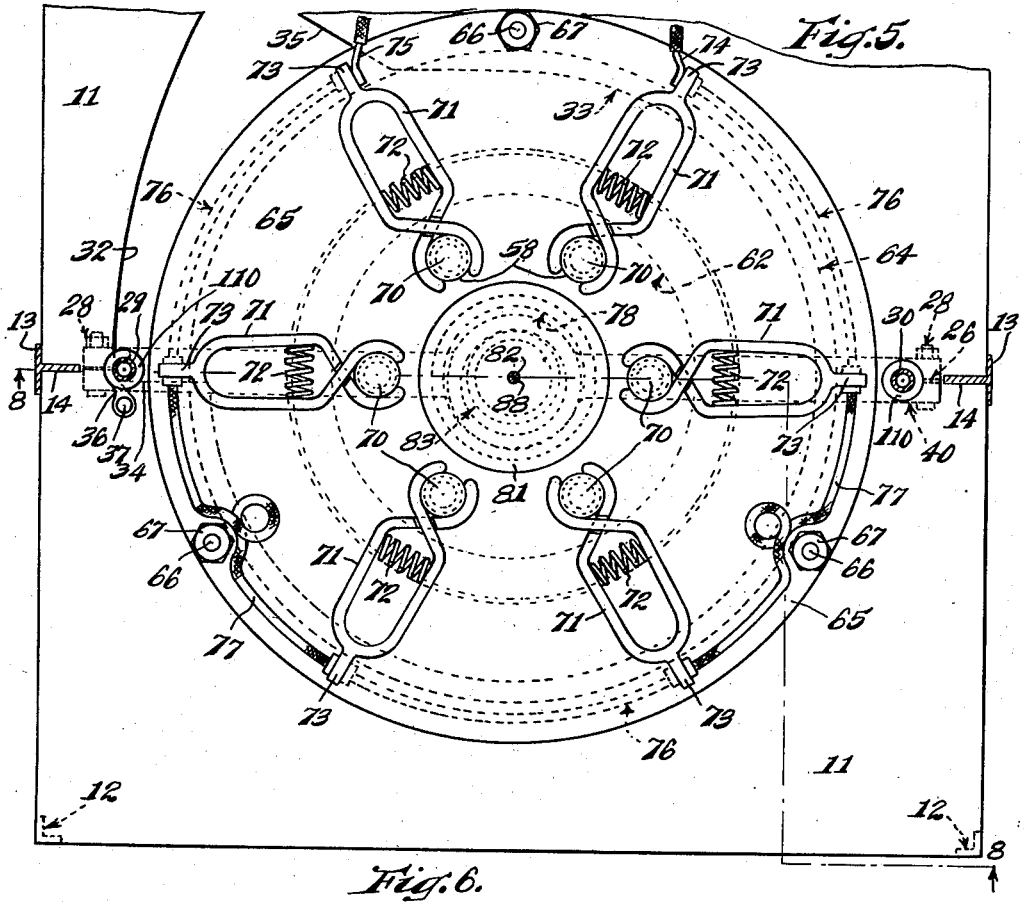
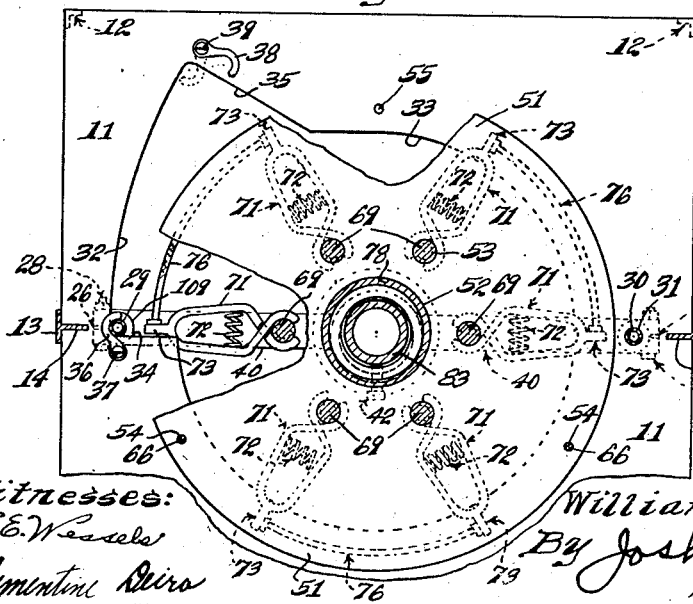
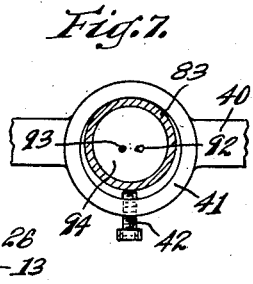
Witnesses:
C. E. Wessels
Clementine Deiro
Inventor:
William H. Owen,
By Joshua R. H. Potts
His Attorney.

Dec. 7, 1943.   W. H. OWEN   2,336,286
DILATION OR EXPANSION TESTING FURNACE AND MEASURING MEANS
Filed Aug. 8, 1940   3 Sheets-Sheet 3

Witnesses:
C. E. Wessels
Clementine Deiro

Inventor:
William H. Owen,
By Joshua R. H. Potts
his Attorney.

Patented Dec. 7, 1943

2,336,286

UNITED STATES PATENT OFFICE 2,336,286

DILATION OR EXPANSION TESTING FURNACE AND MEASURING MEANS

William H. Owen, Hubbard, Ohio

Application August 8, 1940, Serial No. 351,804

14 Claims. (Cl. 73—51)

This invention relates to means for the accomplishment of such objects as measuring the dilation, expansion or coefficient as well as the compressive or tensile strength or stress-strain characteristics of expansion of various materials such as foundry sands and clays, ceramics and other materials.

A specific object of the invention is the provision of a mechanism for the accomplishment of such objects as above stated as will be more economical and more efficient and simpler of operation than any such devices provided heretofore.

An object of my invention, among others, has been the provision of a mechanism including a furnace for accurately measuring or testing the dilation of sands and clays and other materials in which the heavier furnace is stationary and the lighter specimen of work or material or the sand, for example, may be efficiently and easily moved with greater facility into the furnace heating chamber to have its expansion recorded, particularly at highly elevated temperatures, so as to give highly accurate recordings of expansions of different materials and also more easily removed therefrom.

By means of my invention I have provided a mechanism which will measure the dilation or expansion of a standard specimen efficiently and accurately at high temperatures as stated. In, for example, the field of testing and grading foundry sands, standard testing requires a specimen of two inches in diameter and two inches in length besides other requirements of density, etc. The testing, to give satisfactory results, must be highly accurate and to be practical must involve simple apparatus of reasonable cost. By my invention I have provided means which will give distinctly more accurate recordings at all temperatures because it takes into consideration and allows or compensates for the expansion of all parts, particularly higher temperatures, and, in addition, this result is accomplished by apparatus far simpler and less expensive than anything known heretofore.

In addition, in view of the fact that the furnace is stationary and the specimens are movable into and out of the furnace, it will be manifest that it is not necessary to provide flexible parts as is required where the furnace is movable and besides, the specimen may be moved with less force or effort.

Also, by means of my invention, I am able to obtain more accurately these recordings because the mechanism of my invention permits taking into account the expansion of all parts associated in the mechanism which might influence the result.

Other objects and advantages will appear hereinafter and be brought out more fully in the following specification, reference being had to the accompanying drawings, in which:

Fig. 1 is a front elevation of a furnace in accordance with the invention;

Fig. 2 is a side elevation thereof with one of the legs broken away;

Fig. 3 is an enlarged fragmentary elevation of an expansion gauge employed with the furnace;

Fig. 4 is a vertical section taken on the line 4—4 of Fig. 3;

Fig. 5 is an enlarged horizontal section taken on the line 5—5 of Fig. 1;

Fig. 6 is an enlarged horizontal section taken on the line 6—6 of Fig. 1 with parts broken away;

Fig. 7 is an enlarged horizontal section taken on the line 7—7 of Fig. 1;

Figures 8, 9:
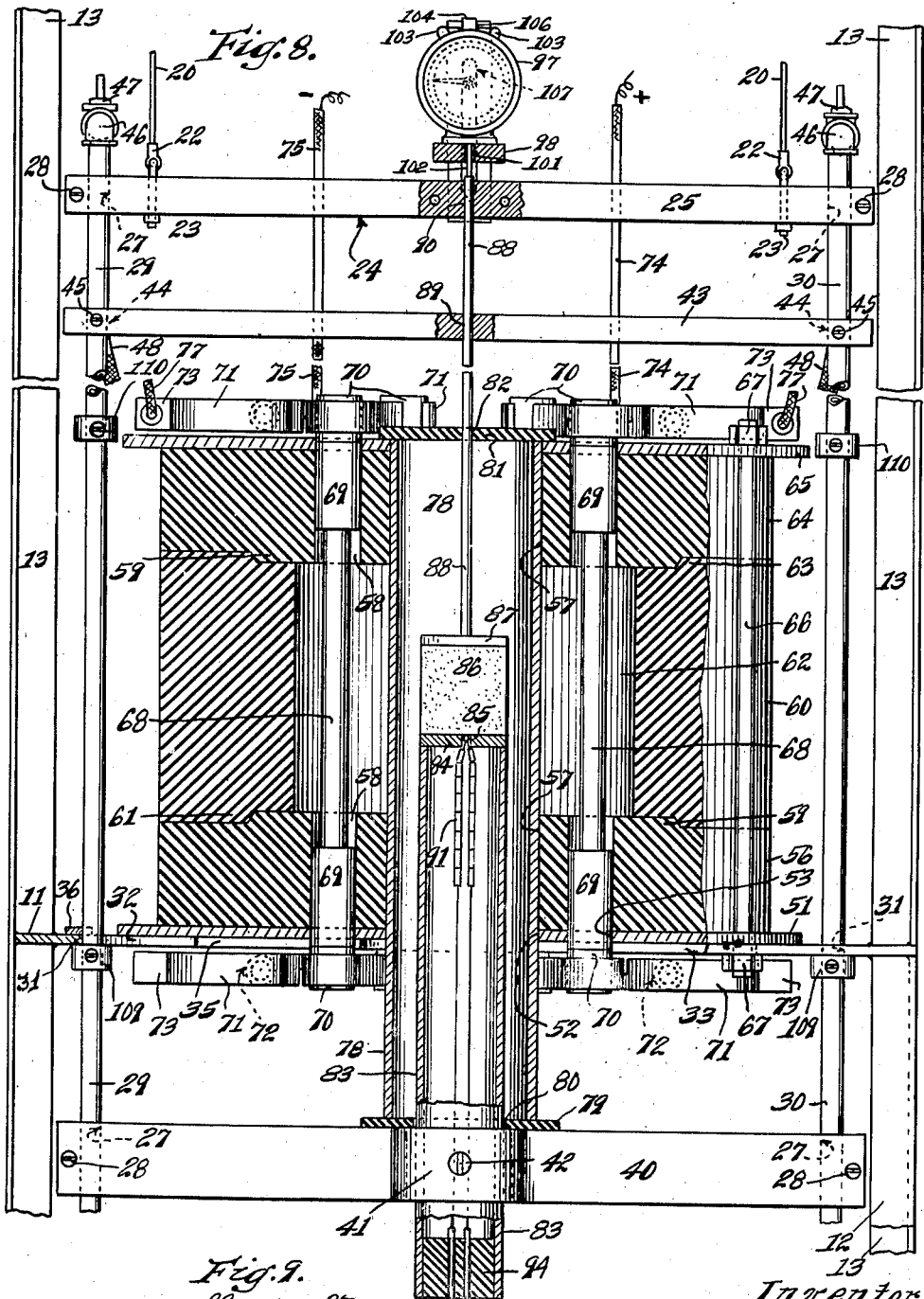
Fig. 8 is a vertical diametrical section taken on the lines 8—8 of Figs. 2 and 5.
Fig. 9 is an enlarged fragmentary plan view of one end of a cross member of the elevator frame.

Referring more particularly to the drawings in which one embodiment of the invention is shown, 10 designates the furnace generally which includes a frame having a horizontal table or metal plate 11 preferably square or rectangular having corner legs 12 for supporting the same at a desired elevation and shown in the form of angle bars welded to the corners of the table or plate 11. At two opposite sides, upright supports or standards 13 are provided equi-distantly between the opposed pairs of corner legs or the corresponding edges of the table and are preferably in the form of T beams fitted in slots or grooves 14 into opposite edges of the plate 11 and welded or otherwise secured. Horizontal cross plates 15 are provided at the upper ends of the standards 13 and support spanning rails 16 consisting of spaced angle bars welded or otherwise secured to the cross plates 15 in parallel relation and rotatably supporting outer sheaves or pulleys 17 and inner sheaves or pulleys 18 arranged upon opposite sides of the standards 13 outwardly and inwardly of the frame and the table or plate 11. Cables 19 and 20 are engaged over the left and right hand sheaves and suspend counterweights 21 at their free ends, while their opposite ends are provided with terminals or cable clamps 22 forming hangers in connection with eye-bolts or the like 23 which suspend an elevator frame 24.

The elevator frame 24 is movable vertically to raise or lower the work or material to be tested for the purpose of measuring the dilation or coefficient of expansion thereof, while the furnace proper is stationary, thus greatly facilitating the operation. The elevator frame is provided with a plurality of cross bars including a top cross bar 25 which is arranged centrally between the opposed standards 13 and has slotted or bifurcated ends 26 forming split jaws having circular openings 27 and apertured horizontally to take clamping bolts 28 to secure the same in fixed relation on movable uprights 29 and 30 shown in the form of vertical pipes designed to take a cooling medium such as water for the purpose of maintaining the parts of the furnace at a uniform temperature under all testing conditions so that the results of the test will be accurate and properly relative. The table plate 11 is provided with openings 31 for the pipes 29 and 30 and is further provided with a segmental slot 32 with its outer edge concentric to the pipe 30 as a pivot but eccentric to the center of the plate 11. This segmental slot communicates with a relatively large central circular opening 33 and the inner end 34 of the slot 32 is arranged radially of the center of the plate 11 in a line between the standards 13 and pipes 29 and 30 at the sides of the latter remote from the slot 32 or offset from the centers of the pipes 29 and 30 when aligned with the center of the plate. The outer end 35 of the slot 32 is offset radially with respect to the center of the pipe 30 and extends as a chord of an arc relative to the central circular opening 33 but eccentric to the center of the latter.

A hook 36 is provided on the table 11, being pivoted at 37 so as to hold the elevator frame with the pipes 29 and 30 aligned with the standards 13 by engaging the pipe 29 when the elevator frame is swung on its pivot 30 so that the pipe 29 will engage the end 34 of the slot 32 and hold the elevator frame and parts carried thereby in operative position. A hook 38 is also provided at the outer end 35 of the slot 32 to engage the pipe 29 when the elevator frame is swung on the pipe 30 as a pivot so that the pipe 29 will engage the outer end 35 of the slot. The hook 38 is pivoted at 39 and thus, like the hook 36, may be readily moved into and out of engagement with the pipe 29.

A lower cross bar 40 similar to the cross bar 25 but slightly heavier and having its ends similarly formed, is connected to the pipes 29 and 30 below the table or plate 11. However, this lower cross bar has an intermediate eccentric ring 41, that is, it projects more at one side then at the other and takes a set screw 42 as shown more particularly in Fig. 7 of the drawings. Another cross bar 43 is disposed a short distance below the cross bar 25 and may be formed similarly to the cross bars 25 and 40. It is shown provided with holes 44 for receiving the pipes 29 and 30 and set screws 45 for securing it in fixed relation to said pipes at its ends and so as to move up and down between and within the standards 13. The pipes 29 and 30 are shown provided with horizontal fittings or branches 46 having elbows at the upper ends of the pipes supporting valves or air cocks 47 having nipples to which inlet supply hose 48 are connected. The lower ends of the pipes 29 and 30 are provided with similar elbows or fittings except the valves and are provided with drains or outlets 49 which may extend to a waste outlet or sewer unless used for recirculation. The water or cooling medium may be supplied from a city water main or other suitable pressure supply or pump not shown. A temperature indicator or thermometer 50 is mounted on each pipe 29 and 30 above the outlet 49 for indicating the temperature of the cooling medium or water, or pipes.

In order to support the furnace proper upon the table or plate 11 which has the openings 32 and 33 as previously described, a circular or annular Transite plate 51 is mounted on the table or plate 11 over the opening 33 but does not cover the slot or opening 32 as seen in Figs. 6 and 8. This plate 51 has a central circular opening 52 and an annular series of concentric openings 53 spaced apart circumferentially and adapted to take heating elements to be later described. Another annular series of spaced openings 54 are also provided in the plate 51 like plate 11 to take tie rods or bolts as will be later described and in addition a similar series of openings 55 are provided in the plate 11 as well as in the plate 51 like the openings 54 in the plate 51. A bottom or lower end member 56 of annular form and of insulating brick rests upon the plate 51 and has a central opening 57 which aligns with the opening 52 and this insulating brick section of annular form is provided with an annular series of spaced openings 58 aligning with the openings 53 in the plate 51 and also with a raised central portion 59 forming an outer recess. A central annular section 60 also of insulating brick rests upon the section 56, the central section having a bottom projection 61 of annular form corresponding to the projection or raised central portion 59 of the end member 56 to fit in the recess of the latter and connect the two sections in interfitting or interlocking relation with a staggered joint between the two. The central section or piece 60 has an enlarged central opening 62 forming an annular furnace chamber proper. The center piece 60 is provided with a raised annular outer portion for projection 63 at the top, corresponding to the bottom projection 61, which interfits with a corresponding annular recess in the bottom face of a top end piece 64 which is the same as the end piece or bottom section 66 except that it is disposed in an inverted position or the two in reverse positions as shown. A Transite top plate 65, the same as the plate 51, is disposed on the top piece 64 and it will be noted that the end section or top piece 64 has similar openings 58 and that the plate 65 has openings corresponding to the openings 53 and 54 in the plate 51. Tie rods or bolts 66 extend through the openings 54 and 55 and are held at the top and bottom by nuts 67 on the threaded terminals thereof so that the furnace proper is bolted to the table or supporting plate 11 which is horizontally arranged and held stationary by reason of the table being anchored to the standards 13. However, this construction permits of the parts being readily assembled or disassembled for renewal or replacement.

The annular series of upper and lower openings 53 and 58 in the plates 51 and 65 and top and bottom end sections 64 and 56 are designed to take heating elements or glow bars 68 which may be of any suitable type for suitable or available voltage and amperage. These heating elements have terminal or end enlargements 69 set back from the ends thereof and spaced from the inner faces of the end furnace sections 56 and 64 but provided with end terminals or caps 70 in the form of electrical conductors such as aluminum designed to withstand the heat and current passing through the same when engaged by clips 71 below the table 11 and above the plate 65. These clips are similar to ordinary spring battery clips of resilient metal as shown more particularly in Figs. 5 and 6 of the drawings and have jaws which are interfitted in crossed relation to engage the terminals 70 which project below the plates 51 and 11 and above the plate 65 while frictionally engaged in the openings 53 and 58 and springs 72 firmly hold the clips against the terminals of the heating elements by expansion between the opposite sides of the clips to firmly clamp the jaws in contracted relation on the terminals. The clips are also provided with terminal ends 75 which may be apertured or otherwise and are disposed near the peripheral edges of the plates 51 and 65 so that the clips extend radially. A supply wire 74 leads to one of the clips and may be connected, in conjunction with a return wire 75 which is also connected to an adjacent upper clip, to a switch, junction box or other source of electric current not shown. Staggered or alternate pairs of bottom clips are connected by conductors 76 with respect to conductors 77 connecting alternate pairs of upper clips and the conductors 77 at the top pass the tie rods 66 so that the current from the supply wire 74 passes through the clip to which it is connected as well as the corresponding heating element and through the corresponding lower clip and then through the conductor 76 of the adjacent lower clip to its corresponding heating element and then through the connected upper clip to the conductor 77 which leads to the adjacent upper clip and connected heating element and so on in series through the conductors, clips and heating elements around the furnace and chamber 62 thereof to the return wire 75 back to the source of supply.

A central axial tube 78 snugly fits in the openings 57 and 52 which are disposed in alignment through the plates 51 and 65 and top and bottom or end sections 64 and 56 of the furnace and forms the annular chamber 62 between it and the inner wall of the central section 69. This tube 78 is preferably of fused silicaware or rough sand surface tube or the like and rough to maintain its position in the openings 52 and 57 and extends below the lower plate 51 and table 11 as seen in Figs. 1, 2 and 8. An asbestos or insulating ring 79 is disposed on the eccentric ring 41 of the cross bar 40 and the lower end of the tube 78 rests thereon to close the lower end of the tube and also give an insulated support against the conduction of heat through the cross bar 40 and so as to move with the latter and the elevator frame of which it forms a part. The asbestos ring 79 has an opening 80 and a top asbestos or insulating ring or disk 81 closes the upper end of the tube 78 and has a small central opening 82 below which is disposed an inner tube 83 considerably spaced from the ring 81 and also comprising a fused silica-ware or rough sand surface tube the same as the tube 78. The inner tube 83 extends through the lower end of the tube 78 and the asbestos or insulating ring 79 at the opening 80 as well as through the eccentric ring 41 of the cross bar 40 and depends below the latter so as to be raised or lowered therewith where it is held by the set screw 42 in the eccentric side of the ring 41 to engage the periphery of the tube 83 in the manner seen in Figs. 7 and 8 of the drawings. A bottom plate 84, preferably of "Vitreosil" or the like, has a central opening 85 and rests upon the upper end of the inner tube 83 and supports the work or material 86 to be tested in the form of a simple cube, grinding stone or sample of sand as previously referred to. Of course, the molded mass or work 86 may be of cylindrical or other shape freely exposed and open all around in the chamber of and spaced from the tube 78 of low expansion qualities and has arranged thereon a top plate or disk 87, preferably of Vitreosil, which is engaged by the lower end of a satin surface extension or extensometer rod 88 which extends through the small central opening 82 in the ring or disk 81 and also through an opening 89 in the cross bar 43 and an opening 90 in the cross bar 25. A thermocouple 91 is disposed in the inner tube 83 and extends into the opening 85 of the bottom plate 84 to contact with the material 86. The wires 92 and 93 forming the conductors of the thermocouple extend through the lower projecting end of the tube 83 at which point an insulating covering may be provided on each wire as well as an insulating plug 94 in the lower end of the tube 83 having spaced openings through which the wires 92 and 93 extend to connect to a suitable temperature gauge 95 which may be supported below on one of the standards 13 to record the temperature in the furnace chamber 62 and of the material being tested and to which it is subjected.

An apertured bracket 96 is mounted against one side of the upper cross bar 25 of the elevator frame as seen more particularly in Figs. 3 and 4 of the drawings and an expansion gauge 97 is adjustably mounted thereon for vertical and horizontal lateral adjustment transversely of the cross bar 25 to bring its contact member in perfect engagement with the rod 88. As shown, the gauge has a base 98 horizontally disposed and provided with a threaded aperture receiving the upper end of an adjustable post or hardened pin 99 depending therefrom in an upright position to extend through a vertical bore of the bracket 96 where it may be adjusted and held in adjusted position by a set screw 100 disposed through a threaded aperture in the bracket to engage the periphery of the post 99. The base is provided with an elongate slot 101 through which a depending contact member or pin 102 of the expansion gauge 97 of any suitable or standard type recording minute degrees or fractions of expansion which may be measured. The gauge 97 or the casing thereof has radial ears 103 at the top disposed on opposite sides of a central lug 104 and an angular bracket 105 has a horizontal upper arm provided with a slot 106 through which the lug 104 extends while the projections or ears 103 ride against the opposite edges of the arm for the purpose of guiding the instrument in its movements when adjusted as well as to accurately guide the same in position. The vertical portion of the angular bracket 105 is provided with a vertical slot 107 through which a set screw 108 extends to engage a tapped socket or bore in the opposite edge of the base 98 whereby the bracket and the gauge may be adjusted vertically and laterally or horizontally and held in adjusted position so that the pin 102 will properly and centrally engage the upper end of the rod 88 which, as before described, extends through the openings 89 and 90 and contacts with the plate 87 within the tube 78 in line with the furnace chamber 62.

A bottom set of collars 109 are provided on the pipes 29 and 30 constituting upright tubular guides or tracks for the elevator frame through the table or platform formed by the plate 11 to engage the bottom face of the table and limit the upward movement of the elevator frame constituting the material or work supporting means so that the latter lighter means may be moved instead of the heavier furnace proper as in prior constructions. An upper set of collars 110 are also mounted upon the pipes 29 and 30 to limit the downward movement of the elevator frame by engagement with the plate 11 or the hook 36 at one side. These collars are held by set screws or other suitable means and may be adjusted on the guides formed by the pipes.

In the operation of the electric dilation or expansion testing furnace as described, the material 86 to be tested is inserted between the unglazed Vitreosil plates 84 and 87 upon the top of the inner tube 83 after the elevator frame or carriage has been lowered with the cables 19 and 20 operating on the pulleys 17 and 18 to raise the counterbalancing weights 21 so as to move the work beneath and out of the furnace chamber. Also, access may be had thereto, or by swinging the elevator frame or carriage forwardly after releasing the hook 36 until the pipe 29 can be engaged by the hook 38 in convenient position better access may be had thereto by the operator. After the material is inserted in position, the hook 38 is disengaged to permit the elevator frame to be swung to the opposite end of the slot 32 away from the edge or wall 35 until it engages the end or edge 34, where it may be held by the hook 36. In this position, the tube 83 is aligned with the axis of the tube 78 and by raising the elevator frame assisted by the lowering of the weights 21 counterbalancing the same, the tube 83 is moved up into the tube 78 until the plate 87 strikes the lower end of the rod 88. By properly aligning the pin 102 with the upper end of the rod 88 by adjustment of the expansion gauge 97 as previously described, both horizontally forwardly or backwardly and vertically, the parts will be in proper position to make an accurate test. By passing a cooling medium or water through the pipes 29 and 30, transference of excessive heat to parts connected thereto and particularly the frame and expansion gauge 97, is prevented and the parts may be maintained at a proper temperature so as to take into consideration and allow or compensate for the expansion of all parts to insure that the test will be made under the same conditions at all times for the different materials being tested whereby the dilation or expansion will be properly registered. Current is then passed through the heating elements 68 within the chamber 62 around the tube 78 to expose the material 86 to the desired temperature registered on the temperature gauge 95 and the temperature of the cooling medium may be observed at the temperature indicators or thermometers 50. Expansion of the material will then act upon the rod 88 to move the indicator or pointer of the expansion gauge 97 to indicate the degree of dilation or expansion from which the coefficient of expansion may be obtained, after which the current of the heating elements may be cut off and the material removed by lowering the same in the manner previously described. This device greatly facilitates the work of testing the materials of the nature described, particularly because it accurately records the expansion taking into consideration and compensating for the temperature of all parts of the device and by reason of the fact that the furnace proper remains stationary while the work is moved and can be more easily handled.

Moreover, the adjustment collars 109 and 110 insure accurate placing of the material at the proper position within the tube 78 approximately at the center of the heating chamber of the furnace and once an adjustment is made for a uniform size, block or cylinder of material, accurate positioning without additional adjustment is insured by reason of the collars 109 striking the bottom of the platform or table 11 under the action of the counterbalancing weights 21 which hold the elevator frame or carriage and the material carried thereby in a raised or operative testing position. When the collars 110 are lowered with the elevator frame and strike the table 11 or the hook 36 at one side, the parts will be supported in inoperative position and in this position, or by swinging the elevator frame laterally, easy access in placing and removing the material to be tested is accomplished.

Thus it will be seen that instead of moving the comparatively heavy and bulky furnace proper, the latter is stationary and the work or material being tested is moved into and out of operative position with respect to the furnace chamber and these movements serve to operatively connect and disconnect the expansion gauge.

Thus, the testing operation may be carried on with much greater facility and less effort than is required in constructions in which the furnace is movable and the work stationary. The work is also rendered more readily accessible, simply by lowering, or by the lateral swinging movement of the elevator frame when the work is disposed below the furnace chamber and out of the same by reason of the pivoting of the elevator frame on the pipe 30 with the pipe 29 swinging in the segmental slot 32 from the operative position at the end wall 34 to the inoperative position at the end wall 35 so that the material may be readily applied in position for testing or removed therefrom. The hooks 36 and 38 serve to hold the elevator frame in either position positively against accidental displacement and thus greater facility is provided in inserting and removing the work or material under test and for determining the dilation, expansion or coefficient thereof efficiently and accurately as required in this art.

In reference to the heating elements 68, they may be of any suitable type for suitable or available voltage and amperage, but it is not desired to restrict the invention to such features. For instance, they may be of 38 volt and 40 ampere capacity for use with the voltage of the electric current available. However, if the current voltage should be changed from 240 volts for which this unit was designed, to 120 volts and the same number of heating elements are used, the electrical characteristics of the elements would necessasrily have to be changed to conform to the requirements of the new source of current.

The tube 78 as well as the tube 83, described as being of fused silica-ware or the like or a sand surface tube, may be such as ordinarily sold under the trade-name "Vitreosil" or any other suitable material of a similar nature so as to serve the functions stated and withstand temperatures to which the same are subjected. In connection with the central axial tube 78, I preferably use a high temperature cement of commercial quality to bind the exterior surface of the tube to the top and bottom end sections 64 and 56 of the furnace. The roughness of the tube aids the cement to bind it to the parts mentioned.

While the material being tested in the operation of the dilation furnace or apparatus as described is rendered readily accessible by simply lowering the elevator frame or carriage without swinging the same forwardly as described and primarily shifting or moving the work or material rather than the furnace proper, it will be understood that the elevator frame or carriage may be swung forwardly in the manner described. However, this is of particular use and advantage to facilitate the introduction of an auxiliary apparatus (not shown) to convert the dilation furnace into a mechanism to determine the compressive or tensile strengths, or stress-strain characteristics of moulding sands, ceramics or other materials at elevated temperatures or for other purposes. Thus, under ordinary circumstances in testing expansion or dilation of the materials it will not be necessary to swing the elevator frame or carriage in the manner described, as by a forward motion from beneath the furnace proper or a reverse motion to dispose the same in line axially with the chamber for elevation into the chamber, in which instance the partial rotation of the elevator frame about a vertical axis formed by the member or pipe 30 is accomplished in the manner described. In other words, to load or unload the specimen for a dilation test, the elevator frame need only be lowered to its lowest permissible position and to place the specimen in its normal testing position, the elevator frame need only be moved in an upward travel so as to center the specimen in the hottest zone of the furnace chamber. However, such movement may be employed under such or other tests or for other uses within the comprehension of the invention or merely by the travel of the elevator frame in only one vertical plane but particularly as far as the dilation test is concerned as it is thought will be readily understood by those skilled in this art.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A furnace of the class described comprising a vertical heating chamber open at the bottom and closed at the top, material supporting means movable vertically into and out of the chamber from the bottom thereof and means above the heating chamber for indicating the expansion of the material under the action of heat in the chamber.

2. A dilation or expansion testing furnace for materials as described comprising a vertical frame, a stationary heating chamber carried by the frame and open at the bottom only, a carriage movably supported for vertical movement in the frame and adapted to support the material to be tested for vertical movement into and out of the chamber, heating means for the chamber, and means engaged by the material when the latter is moved into the chamber for recording the expansion of the material under the action of heat in the chamber.

3. A dilation or expansion testing furnace for materials as described comprising a frame, a stationary heating chamber carried by the frame, a carriage movably supported in the frame and adapted to support the material to be tested for vertical movement into and out of the chamber and into and out of the path of the chamber and out of contact therewith, said material adapted to expand in the chamber under the action of heat therein, an expansion gauge associated with the carriage and an operative connection between the material and the gauge to actuate the latter upon the expansion of the material.

4. A dilation or expansion testing furnace for materials as described comprising an upright frame, a stationary heating chamber carried by the frame and open at one end only, a carriage movably supported in the frame and adapted to support the material to be tested for movement directly into and out of the chamber and laterally movable into and out of the path of the chamber and out of contact therewith, means for supporting the carriage in an operative or inoperative position, hollow supporting means for the material to be tested, a thermocouple associated therewith and extending up through the supporting means in contact with the material, a gauge on the carriage for indicating expansion and a rigid connection between the material and the gauge for operating the latter according to the expansion of the material.

5. A furnace of the class described including a chamber having means for heating the same, movable means for supporting the material to be tested in enclosed spaced relation to and entirely within the chamber and movable vertically into and out of the chamber and mounted to move away from a position beneath the chamber, a rod associated with and adapted to engage the material when in the chamber and an expansion gauge having an operating member to contact one end of the rod for actuation of the gauge by the expansion of the material.

6. A furnace of the class described including a chamber having means for heating the same, vertically movable means for supporting the material to be tested in spaced relation to and movable directly into and out of the chamber, an extensometer rod associated with the chamber and adapted to engage the material, an expansion gauge adjustable in a plurality of directions and having an operating member to contact one end of the rod for actuation of the gauge by the expansion of the material and movement of the rod, and means for moving the material supporting means into and out of the path of the chamber for placing and removing the material.

7. A furnace of the class described including a chamber having means for heating the same, a vertically slidable carriage for supporting the material to be tested and movable into and out of the chamber, means to limit the movement of the carriage in either direction, a vertical rod depending from said carriage and adapted to engage the material, an expansion gauge having a depending operating member to contact the upper end of the rod for actuation of the gauge by the expansion of the material, and a vertically and horizontally adjustable bracket on said carriage supporting the gauge for vertical and horizontal adjustment thereof whereby to align the operating member with the rod to cause contact thereof with the end of the rod.

8. A furnace of the class described including a frame, a horizontal support on the frame, an elevator frame movable in the first-named frame, counterbalancing means for said elevator frame, a furnace proper having a heating chamber and mounted on the horizontal support, means for securing the furnace proper to the support against movement, a tube supported on the elevator frame, a tube in the chamber and having an open lower end into which the first-named tube is adapted to extend, means for closing the ends of the second-named tube, a pair of plates on the first-named tube between which the material is adapted to be supported, the lower plate having an opening, a thermocouple in the first tube to contact the material through said opening, a gauge supported on the elevator frame, operative connections between the gauge and the top plate to indicate the expansion of the material under the action of heat, said elevator frame being movable into and out of the path of the second-named tube when the first-named tube is displaced through the open end thereof together with the material and means for holding the elevator frame in an operative or inoperative position.

9. A furnace of the class described comprising a frame having a horizontal stationary table, a stationary furnace mounted thereon, a work support having a carriage vertically movable in the frame and adapted to be moved into or below the furnace chamber, heating elements associated with the chamber, means to center the work support in the chamber together with the work thereon, said work support being pivotally mounted on a vertical axis to move laterally out of the path of the chamber when lowered, means for holding the work support in alignment with the chamber and an expansion gauge operatively associated with the chamber for engagement with the work to indicate the expansion thereof under heat.

10. A dilation or expansion testing furnace for materials as described comprising a vertical stationary heating chamber closed at the top and open at the bottom, material supporting means movable into and out of the chamber from the bottom, a refractory wall in said chamber in spaced relation around said material when in said chamber and means normally disengaged from the material and engaged thereby when the material is moved into the chamber for indicating the expansion of the material under the action of heat in the chamber.

11. A furnace for measuring the dilation, expansion or coefficient of expansion of various materials such as foundry sands, clays and ceramics including a stationary furnace having a vertical heating chamber open at one end and closed at the other, a refractory tube fixedly supported within the chamber and extending below the same, heating elements around said tube, a second refractory tube movable vertically into and out of the first tube in spaced relation thereto with a molded mass of material to be tested mounted on the second tube and disposed with its surrounding surface in spaced relation to the first tube, refractory plates on the second tube between which the material is interposed, cooling means supporting the second tube for movement and a gauge engaging one plate for indicating the expansion of the material.

12. A furnace for measuring the dilation, expansion or coefficient of expansion of various materials such as foundry sands, clays, and ceramics including a stationary furnace having a heating chamber open at one end and closed at the other, a refractory tube within the chamber, heating elements around said tube, a second refractory tube movable into and out of the first tube in spaced relation thereto, refractory plates mounted on the second tube with a molded mass of material to be tested interposed between said refractory plates and disposed with its surrounding surface in spaced relation to the first tube, cooling means supporting the second tube for movement, a gauge engaging one plate for indicating the expansion of the material and means for closing the bottom of the first tube when the second tube is moved into the same.

13. A testing furnace of the class described including a frame, a vertically adjustable carriage movable in the frame, a stationary furnace carried by the frame and having a chamber open at the bottom, a work support on the carriage and movable therewith into and out of the furnace, and means to support the carriage for horizontal movement beneath and outwardly of the furnace.

14. A testing furnace of the class described, including a vertical heating chamber open at one end, a refractory tube movable into and out of the chamber at one end and having a refractory plate at the top thereof, and a thermocouple extending up through the tube and through the plate for direct contact with material thereon to be tested.

WILLIAM H. OWEN.